United States Patent
Saito

(10) Patent No.: US 10,520,898 B2
(45) Date of Patent: Dec. 31, 2019

(54) DRIVING DEVICE AND ELECTRONIC TIMEPIECE

(71) Applicant: CASIO COMPUTER CO., LTD., Tokyo (JP)

(72) Inventor: Yuta Saito, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 184 days.

(21) Appl. No.: 15/460,651

(22) Filed: Mar. 16, 2017

(65) Prior Publication Data
US 2017/0277130 A1  Sep. 28, 2017

(30) Foreign Application Priority Data
Mar. 22, 2016  (JP) .................................. 2016-057048

(51) Int. Cl.
| | | |
|---|---|---|
| H02P 8/08 | (2006.01) | |
| H02P 8/38 | (2006.01) | |
| H02P 23/16 | (2016.01) | |
| G04C 3/14 | (2006.01) | |
| H02P 8/02 | (2006.01) | |

(52) U.S. Cl.
CPC ................ G04C 3/143 (2013.01); H02P 8/02 (2013.01); H02P 8/38 (2013.01)

(58) Field of Classification Search
CPC ..................................... G04B 1/16; G04B 5/08
See application file for complete search history.

(56) References Cited

U.S. PATENT DOCUMENTS

| | | | | |
|---|---|---|---|---|
| 4,312,059 A | * | 1/1982 | Mandai | ..................... H02P 8/16 318/696 |
| 4,326,278 A | * | 4/1982 | Shida | ..................... G04C 3/143 318/696 |
| 5,973,469 A | * | 10/1999 | Higuchi | ..................... H02P 6/20 318/254.1 |
| 6,108,279 A | | 8/2000 | Hara | |
| 2006/0186853 A1 | | 8/2006 | Brummack et al. | |
| 2011/0080132 A1 | | 4/2011 | Ogasawara et al. | |

(Continued)

FOREIGN PATENT DOCUMENTS

| | | |
|---|---|---|
| CN | 1190755 A | 8/1998 |
| CN | 1745344 A | 3/2006 |

(Continued)

OTHER PUBLICATIONS

U.S. Appl. No. 15/667,370, filed Aug. 2, 2017.
(Continued)

*Primary Examiner* — Kawing Chan
*Assistant Examiner* — Charles S Laughlin
(74) *Attorney, Agent, or Firm* — Chen Yoshimura LLP

(57) ABSTRACT

A driving processor for driving a motor having a rotor and one or more coils for rotating the rotor is configured to generate a detection pulse for detecting whether or not the rotor has rotated; cause the generated detection pulse to be applied to at least one of the one or more coils; receive a signal indicating a detected value of current flowing in the at least one of the one or more coils after the detection pulse has been outputted to the at least one of the one or more coils; and determine whether or not the rotor has rotated to one or more prescribed positions on the basis of the detected value of current.

4 Claims, 11 Drawing Sheets

(56) References Cited

U.S. PATENT DOCUMENTS

2015/0085625 A1   3/2015  Saito et al.
2015/0092522 A1   4/2015  Saito et al.
2017/0277131 A1   9/2017  Saito et al.
2018/0088533 A1   3/2018  Saito

FOREIGN PATENT DOCUMENTS

| CN | 102035450 A | 4/2011 |
|----|-------------|--------|
| CN | 104467345 A | 3/2015 |
| CN | 104518636 A | 4/2015 |
| JP | S61-15380 B2 | 4/1986 |
| JP | H9-266697 A | 10/1997 |

OTHER PUBLICATIONS

Chinese Office Action dated Feb. 19, 2019, in a counterpart Chinese patent application 201710174231.8. (A machine translation (not reviewed for accuracy) attached.).

Chinese Office Action dated Mar. 18, 2019, in a counterpart Chinese patent application 201710685625.X. (A machine translation (not reviewed for accuracy) attached. Cited in the related U.S. Appl. No. 15/667,370.).

\* cited by examiner

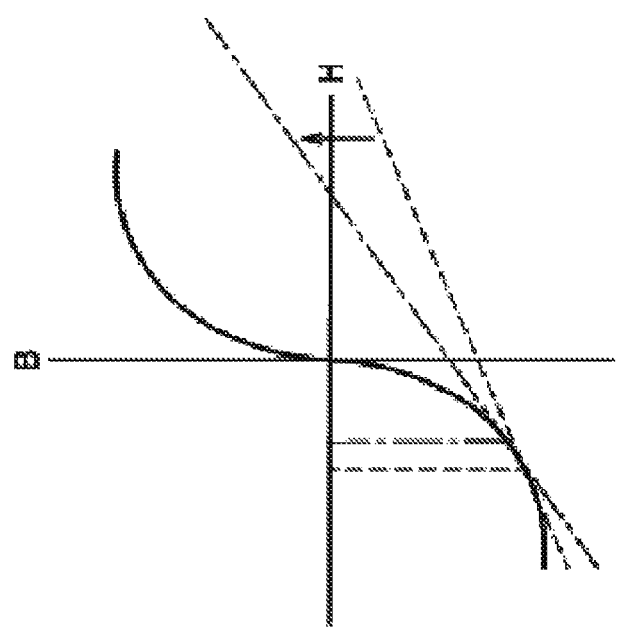
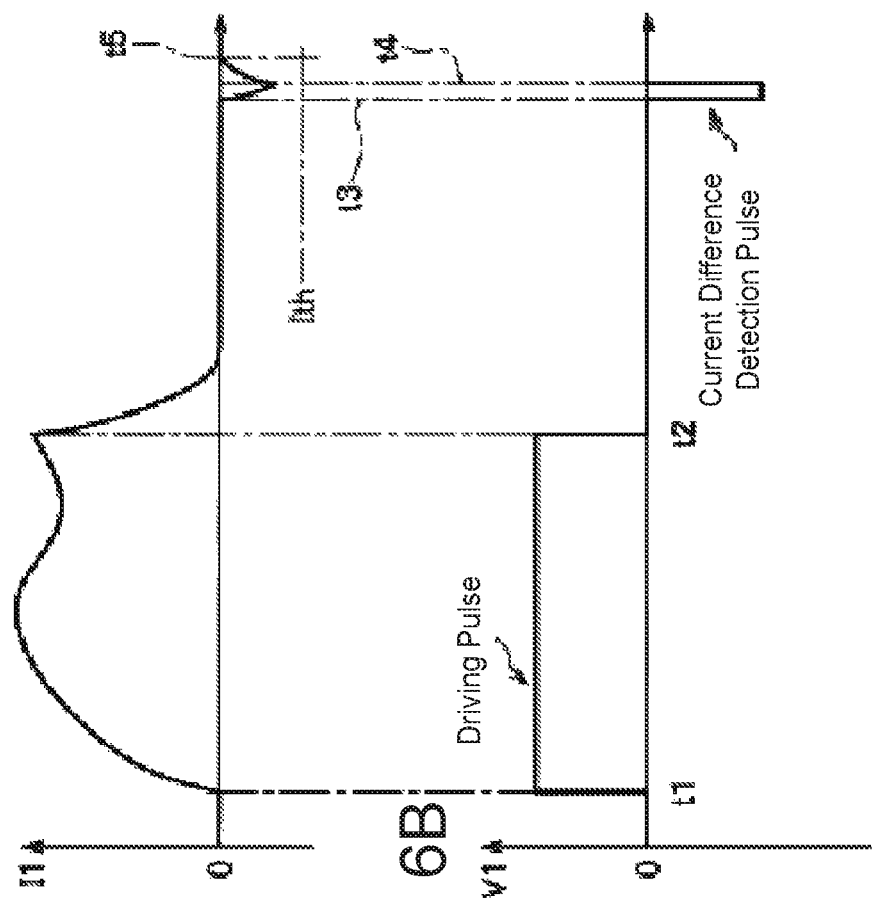
FIG. 6A
FIG. 6B
FIG. 6C

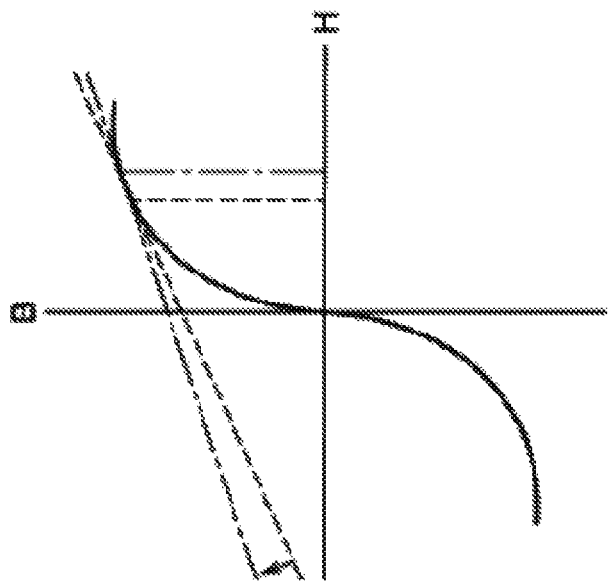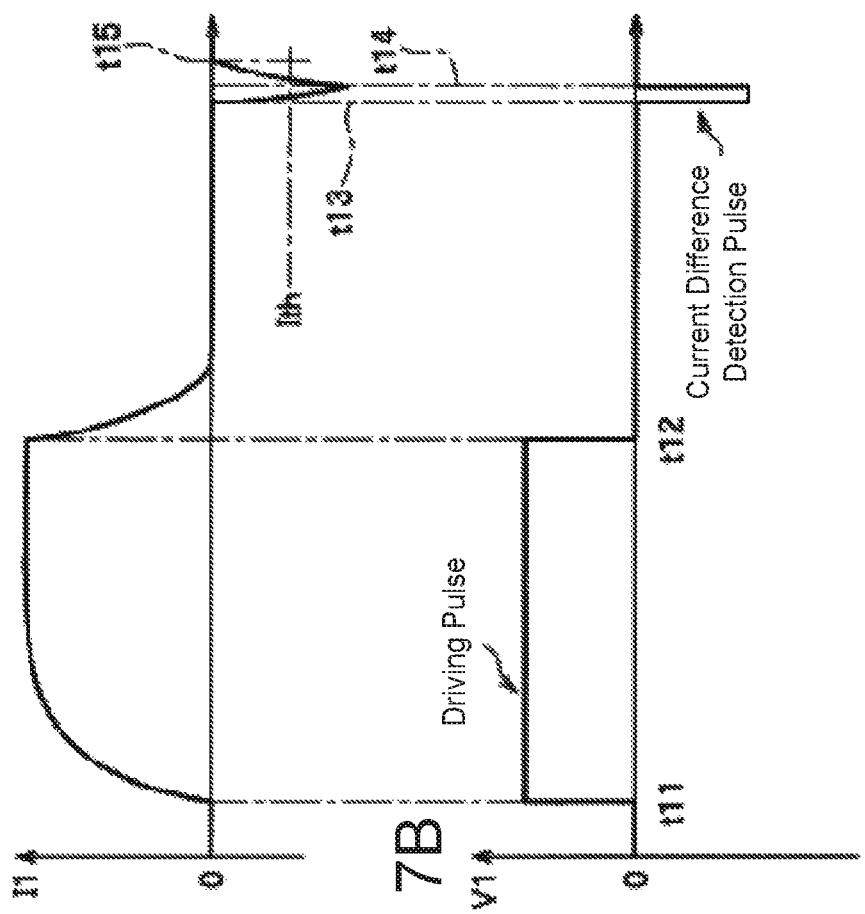

DRIVING DEVICE AND ELECTRONIC TIMEPIECE

BACKGROUND OF THE INVENTION

Technical Field

The present invention relates to a driving device and an electronic timepiece.

Background Art

In a stepping motor, it is necessary for the rotor to rotate reliably at each step. Thus in driving control of a stepping motor, it is determined whether or not the rotor has rotated (rotor rotation detection). Specifically, this determination is made by detecting back EMF (back-voltage) produced by damping when, after a driving pulse has been applied to rotate the rotor, the rotor is stopped at a prescribed step angle. A correction pulse is further applied to rotate the rotor in the case where it has been determined that the rotor has not rotated.

However, "damping" of the rotor refers to transforming the kinetic energy of the rotor into Joule heat, and thus in a certain sense is a wasteful consumption of power. Techniques that accordingly reduce the speed of the rotor near a step angle in order to reduce energy loss caused by damping are known.

For example, the Japanese Patent Document Japanese Patent Application Laid-Open Publication No. H9-266697 discloses the following: "A driving pulse supplied to a step motor is subjected to chopper control such that the duty cycle of driving pulses is set to be lower in an initial stage and a final stage than in a middle stage. This makes it possible to set an effective power distribution of the driving pulses to be lower in the initial stage and the final stage and higher in the middle stage, causing the step motor to produce a torque matching the cogging torque of the step motor. The rotor is rotated at a low speed while eliminating wasteful power consumption in the initial stage and final stage of the driving pulses, which makes it possible to reduce the amount of power consumed to drive the step motor."

However, the level of the back EMF is proportional to the rotation speed of the rotor. Thus if the speed of the rotor is reduced near the step angle as described above, the level of the back EMF will also drop near the step angle, resulting in a drop in the accuracy of rotation detection.

Meanwhile, there is a technique that uses a magnetic saturation phenomenon arising in a stator core as a method for detecting the position of a motor having a permanent magnet in the rotor. That is, if a magnetic flux produced by the permanent magnet and a magnetic flux produced by a coil are in a mutually-strengthening relationship, magnetic saturation of the core will have an increased effect, and the inductance of the coil will drop. On the other hand, if the magnetic flux produced by the permanent magnet and the magnetic flux produced by the coil are in a mutually-weakening relationship, the magnetic saturation will have a reduced effect, and the inductance of the coil will rise. As such, measuring the inductance of the coil makes it possible to estimate the rotation angle of the rotor.

SUMMARY OF THE INVENTION

According to the past technique of using the magnetic saturation phenomenon, a high-frequency voltage is applied to the coil in order to measure the inductance of the coil. An increased amount of power is consumed in order to apply the high-frequency voltage, which defeats the original purpose of controlling the rotation speed of the rotor to suppress the amount of power consumed.

Having been achieved in light of the circumstances described above, this invention provides a driving device and an electronic timepiece capable of accurately detecting the rotation of a rotor while suppressing power consumption. Accordingly, the present invention is directed to a scheme that substantially obviates one or more of the problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a driving processor for driving a motor having a rotor and one or more coils for rotating the rotor, the driving processor being configured to: generate a detection pulse for detecting whether or not the rotor has rotated; cause the generated detection pulse to be applied to at least one of the one or more coils; receive a signal indicating a detected value of current flowing in the at least one of the one or more coils after the detection pulse has been outputted to the at least one of the one or more coils; and determine whether or not the rotor has rotated to one or more prescribed positions on the basis of the detected value of current.

In another aspect, the present invention provides a driving device, including: the driving processor as set forth above; and the motor having the rotor and the one or more coils, wherein the one or more coils are a first coil and a second coil, wherein the motor is configured such that a magnetic flux density when current flows in the first coil is greater than a magnetic flux density when current flows in the second coil, regardless of a position at which the rotor stops; and wherein the signal received by the driving processor indicates the detected value of current flowing in the first coil, and the driving processor determines whether or not the rotor has rotated on the basis of the detected value of the current flowing in the first coil.

In another aspect, the present invention provides an electronic timepiece, including the driving processor as set forth above; the motor having the rotor and the one or more coils; and a display unit including a hand driven by the rotor, wherein the driving processor or another processor calculates a time and causes the hand to be driven to a position corresponding to the calculated time so as to display the time in the display unit.

It is to be understood that both the foregoing general description and the following detailed description are exemplary and explanatory, and are intended to provide further explanation of the invention as claimed.

BRIEF DESCRIPTION OF THE DRAWINGS

FIG. 6A is a waveform diagram illustrating coil current when rotation is successful according to Embodiment 1.

FIG. 6B is a waveform diagram illustrating coil voltage when rotation is successful according to Embodiment 1.

FIG. 6C is a diagram illustrating BH characteristics when rotation is successful according to Embodiment 1.

FIG. 7A is a waveform diagram illustrating coil current when rotation fails according to Embodiment 1.

FIG. 7B is a waveform diagram illustrating coil voltage when rotation fails according to Embodiment 1.

FIG. 7C is a diagram illustrating BH characteristics when rotation fails according to Embodiment 1.

DETAILED DESCRIPTION OF EMBODIMENTS

Embodiment 1

Configuration of Embodiment 1

Hereinafter, embodiments of the present invention will be described in detail with reference to the drawings.

Figure 1:
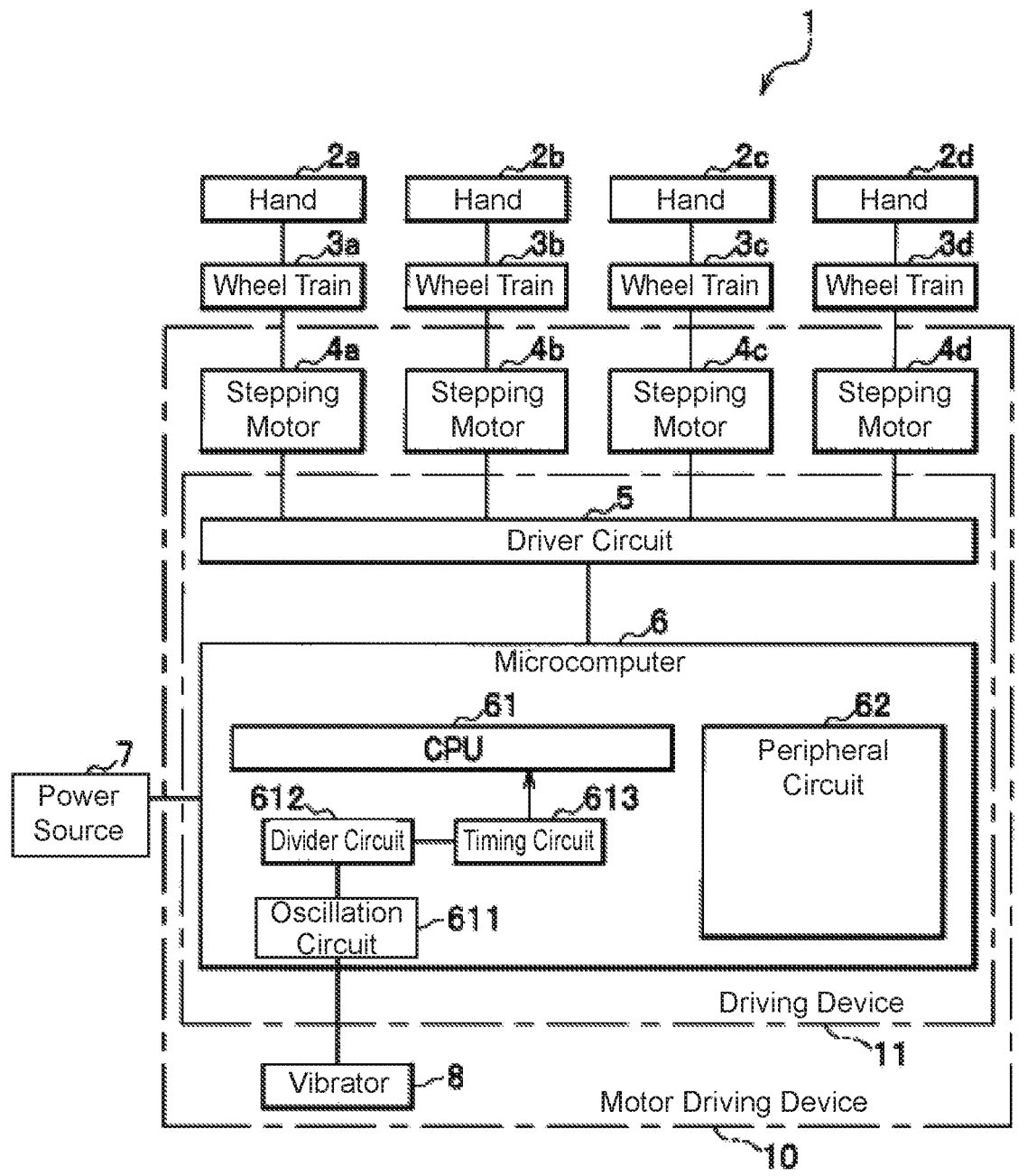
FIG. 1 is a block diagram illustrating an electronic timepiece according to Embodiment 1 of the present invention.

FIG. 1 is a diagram illustrating the overall configuration of an electronic timepiece 1 according to Embodiment 1 of the present invention.

The analog electronic timepiece 1 according to the present embodiment is capable of driving four hands 2a to 2d (display units) using independent motors. Although not particularly limited, the electronic timepiece is a wristwatch-type electronic timepiece including a band for securing the timepiece to an arm, for example. The electronic timepiece 1 includes, for example, the hands 2a to 2d, and stepping motors 4a to 4d (motors) that rotationally drive corresponding hands 2a to 2d via corresponding wheel train mechanisms 3a to 3d (display units). The electronic timepiece 1 further includes a driving circuit 5 that drives the stepping motors 4a to 4d, a microcomputer 6, a power source 7, and a vibrator 8.

The hands 2a to 2d will simply be referred to as hands 2 when no particular distinction needs to be made among them. Likewise, the wheel train mechanisms 3a to 3d will simply be referred to as wheel train mechanisms 3 when no particular distinction needs to be made among them. Furthermore, the stepping motors 4a to 4d will simply be referred to as stepping motors 4 when no particular distinction needs to be made between them.

A part including the stepping motors 4, the driving circuit 5, the microcomputer 6 (a controller), and the vibrator 8 will be called a "motor driving device 10." Additionally, because the microcomputer 6 and the driving circuit 5 have a function for detecting whether or not the stepping motors 4 have rotated correctly, the driving circuit 5 and the microcomputer 6 will be called a "driving device 11".

The driving circuit 5 has a bridge circuit that drives the stepping motors 4, and applies voltages to the stepping motors 4 in response to commands from the microcomputer 6. The microcomputer 6 is a large-scale integration (LSI) chip, and includes a central processing unit (CPU) 61, a peripheral circuit 62, an oscillation circuit 611, a divider circuit 612, and a timing circuit 613.

The hands 2a to 2d are provided so as to be capable of rotating around a rotation axis on a face plate. The wheel train mechanisms 3a to 3d cause the corresponding hands 2a to 2d to rotate. At appropriate timings, the driving circuit 5 outputs driving voltage signals for driving the stepping motors 4a to 4d on the basis of control signals inputted from the microcomputer 6. The driving circuit 5 can adjust and output the driving voltages, driving voltage pulse widths, and so on of the stepping motors 4 on the basis of setting signals from the microcomputer 6. The driving circuit 5 can output driving voltage signals to cause the stepping motors 4 to rotate forward or reverse.

The CPU 61 controls the overall operations of the electronic timepiece 1 by carrying out various types of computational processes. The CPU 61 reads out and executes control programs to cause units to continuously carry out operations related to displaying the time, and to cause units to carry out operations in real time or at specified timings on the basis of operational inputs made to an operation unit (not illustrated). The CPU 61 is a control unit that sets target positions to which the hands 2 are to move and controls the driving of the stepping motors 4 through the driving circuit 5.

The oscillation circuit 611 generates a unique frequency signal and outputs the signal to the divider circuit 612. A circuit that oscillates when combined with the vibrator 8, which is a crystal or the like, is used as the oscillation circuit 611, for example. The divider circuit 612 divides the signal inputted from the oscillation circuit 611 into various frequency signals used by the CPU 61, the timing circuit 613, and so on, and outputs the resulting signals. The timing circuit 613 is a counter circuit that counts the number of a prescribed frequency signal inputted from the divider circuit 612 and adds the obtained number to an initial time so as to measure the current time. The current time measured by the timing circuit 613 is read out by the CPU 61 and used to display the time. This time measurement may be controlled by software.

The power source 7 is configured to be capable of continuously and stably operating the electronic timepiece 1 for long periods of time, and is a combination of a battery and a DC-DC converter, for example. This ensures that an output voltage of the power source 7 stays at a prescribed value during operation.

Figure 2:
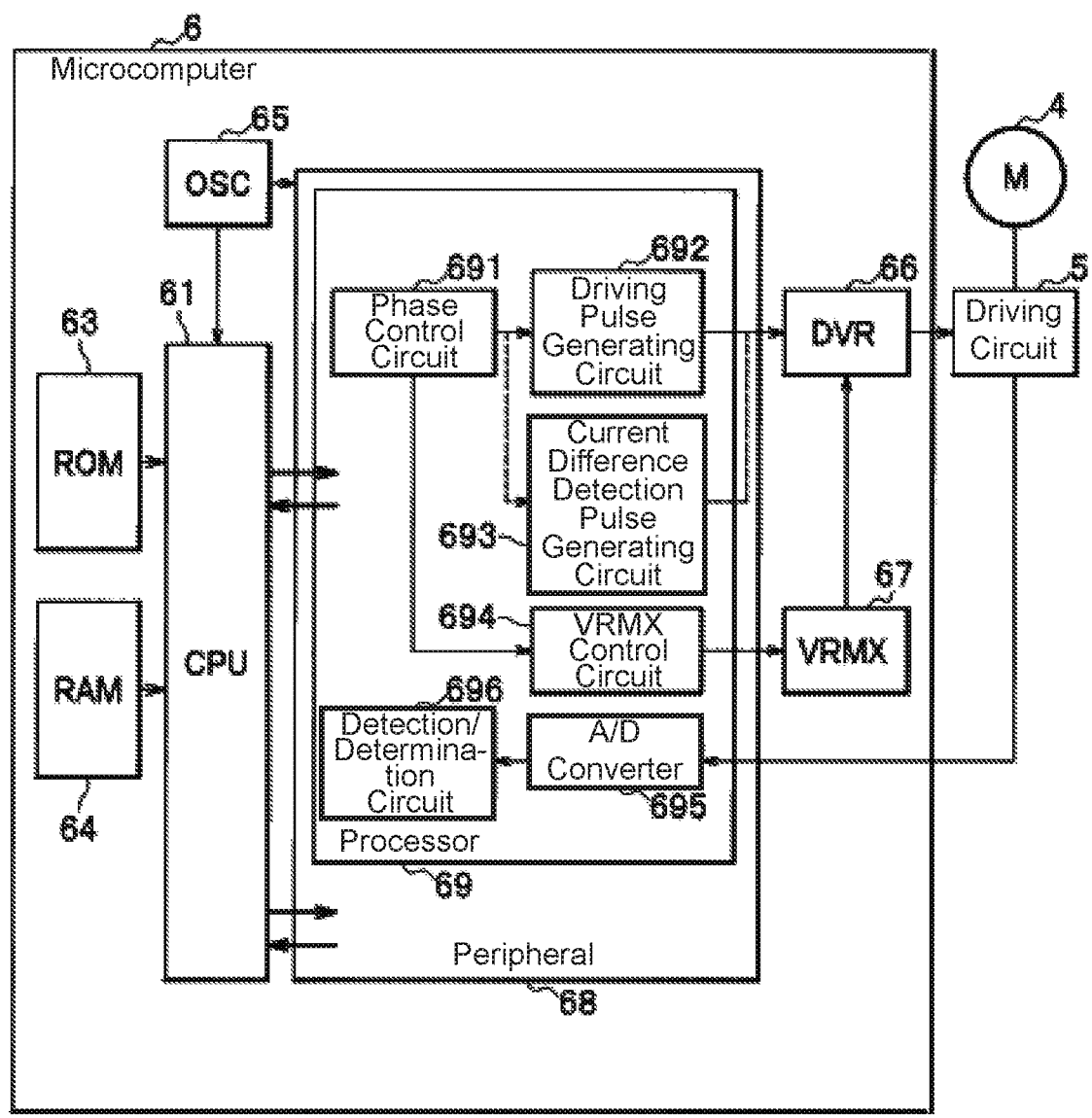
FIG. 2 is a block diagram illustrating a microcomputer according to Embodiment 1.

FIG. 2 is a block diagram illustrating an overview of the microcomputer 6, which is an LSI chip. The microcomputer 6 includes the CPU 61, a read-only memory (ROM) 63, a random access memory (RAM) 64, an oscillator (OSC) 65, a peripheral 68, a VRMX 67, and a DVR 66. The ROM 63 stores various control programs, default setting data, and so on. The various control programs (not illustrated) are read out and continuously executed by the CPU 61 when the electronic timepiece 1 is started.

The RAM 64 is a volatile memory such as an SRAM or a DRAM, and provides a working memory space for the CPU 61. Additionally, user setting data and the like, set on the basis of operational inputs made to the operation unit, can also be temporarily stored in the RAM 64. Part of the RAM 64 may be a non-volatile memory such as a flash memory or an Electrically Erasable and Programmable Rear-Only Memory (EEPROM). The OSC 65 generates a unique frequency signal and supplies the signal to the CPU 61, the peripheral 68, and so on, and corresponds to a combination of the oscillation circuit 611 and the vibrator 8 illustrated in FIG. 1.

The DVR 66 is a circuit that drives signals for driving the motor. The VRMX 67 is a regulator that generates power to supply to the DVR 66. The peripheral 68 includes a processor 69. The processor 69 includes a phase control circuit 691, a driving pulse generating circuit 692, a current difference detection pulse generating circuit 693, a VRMX control circuit 694, an A/D converter 695, and a detection/determination circuit 696. Note that the phase control circuit 691, the driving pulse generating circuit 692, the current difference detection pulse generating circuit 693, the VRMX control circuit 694, the A/D converter 695, and the detection/determination circuit 696 may be a processor within a single microcomputer, or may be provided as individual processors and operated by a single microcomputer or a plurality of microcomputers.

The phase control circuit 691 controls a series of phases including the output of driving pulses and the generation of current difference detection pulses. The driving pulse generating circuit 692 outputs driving pulses to the motor, and the current difference detection pulse generating circuit 693 outputs the current difference detection pulses (described in detail later) to the motor. The VRMX control circuit 694 controls the VRMX 67 to generate a prescribed source voltage. The A/D converter 695 converts an analog voltage at a prescribed location of the driving circuit 5 (described in detail later) into a digital signal. The detection/determination circuit 696 determines whether or not the stepping motors 4 have rotated on the basis of the digital signal.

Figure 3:
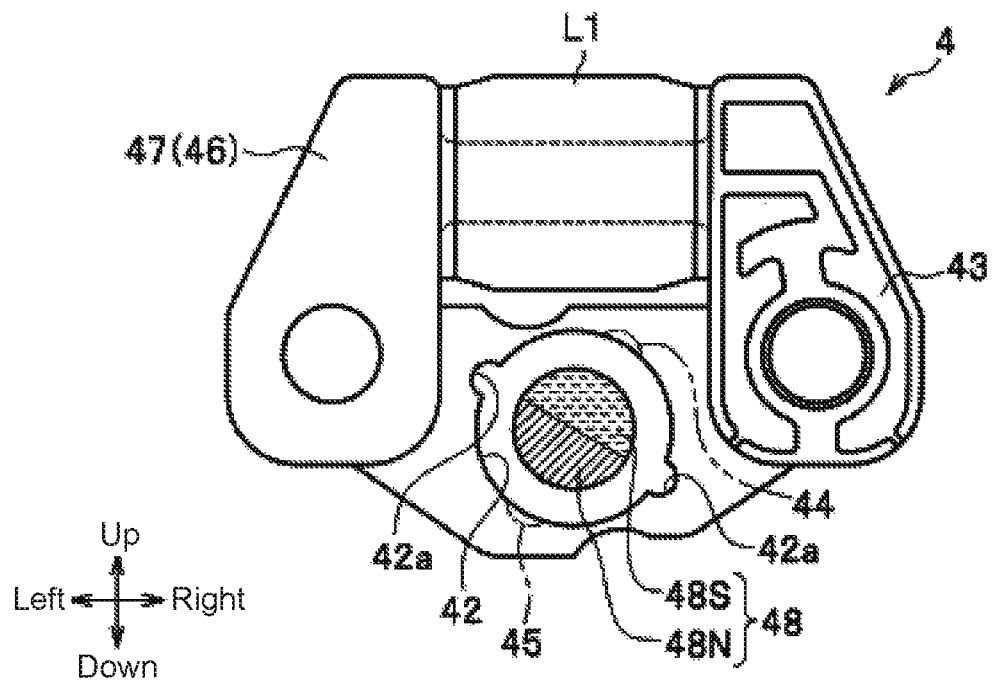
FIG. 3 is a plan view of a stepping motor according to Embodiment 1.

FIG. 3 is a plan view of the stepping motor 4, which has a single-core configuration.

The stepping motor 4 includes a stator 47 and a rotor 48. The rotor 48 is formed having a disk shape and is supported so as to be capable of rotating in a rotation direction, and includes a magnet bipolarized in a radial direction. In the rotor 48, the lightly-hatched part corresponds to an S pole 48S, whereas the darkly-hatched part corresponds to an N pole 48N. A magnet such as a rare earth magnet (a samarium cobalt magnet, for example) can be used favorably as the rotor 48, but the rotor 48 is not limited thereto.

The rotor 48 is disposed so as to be capable of rotating central to a shaft (not illustrated) provided in the stator 47. Note that in the present embodiment, the rotor 48 can rotate counter-clockwise or clockwise at a prescribed step angle in response to a driving pulse being applied to a coil L1, which will be described later. In the case where the stepping motor 4 is applied in a timepiece or the like, the rotor 48 is linked to gears constituting the corresponding wheel train mechanism 3 for moving the corresponding hand 2 of the timepiece, for example. The rotation of the rotor 48 then causes those gears and the like to rotate.

The stator 47 includes a core 46 formed having a substantially quadrangular frame shape, and the coil L1 is wound around an upper side area of the core 46. A substantially circular opening 42 is formed in a central area of a lower side of the core 46, and the rotor 48 is disposed concentric to the opening 42. When a current flows in the coil L1, magnetic poles arise in the stator 47 near regions 44 and 45. The polarities of the magnetic poles in the regions 44 and 45 are determined by the direction of the current flowing in the coil L1. The coil L1 is connected to the driving circuit 5 (see FIG. 1) via a terminal block 43.

Thus, the rotor 48 rotates when the coil L1 is driven such that magnetic poles repelling the S pole 48S and the N pole 48N arise in the regions 44 and 45. Meanwhile, two recesses 42a are formed in the stator 47, in an inner circumferential surface of the opening 42 that accommodates the rotor 48. When the upward direction is assumed to be 0 degrees, the two recesses 42a are formed at approximately 60 degrees and approximately 240 degrees, respectively. The rotor 48 can be kept in a static state by the two recesses 42a.

In the present embodiment, the stepping motor 4 has the highest index torque (holding torque) in a state where the S pole 48S and the N pole 48N oppose the regions 44 and 45. As such, in a de-energized state, that is, when no driving pulse is being applied, the rotor 48 magnetically stabilizes and stops at the stopped position illustrated in FIG. 3 or a stopped position rotated 180 degrees from that stopped position.

Figure 4:
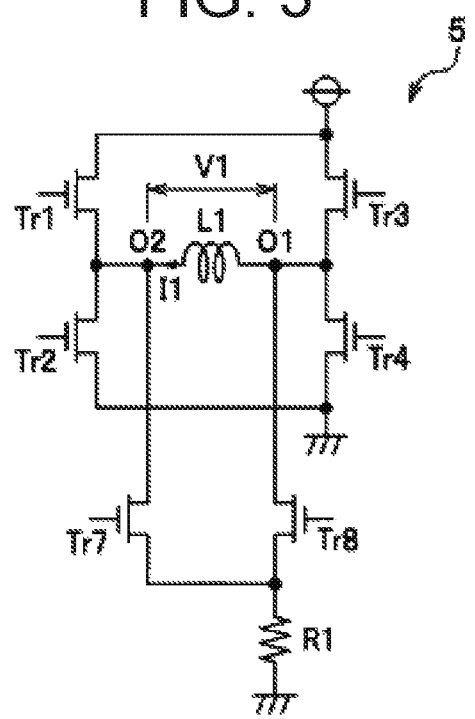
FIG. 4 is a circuit diagram illustrating a driving circuit according to Embodiment 1.

FIG. 4 is a circuit diagram illustrating the driving circuit 5.

The driving circuit 5 applies driving pulses and current difference detection pulses to the coil L1, and includes an H-bridge circuit constituted of switching elements Tr1 to Tr4, which are Metal-Oxide-Semiconductor Field-Effect Transistors (MOSFETs). Meanwhile, switching elements Tr7 and Tr8 and a resistor R1 constitute a discharge circuit that discharges energy stored in the coil L1. A terminal voltage of the coil L1 will be called a coil voltage V1, and a current flowing in the coil L1 will be called coil current I1.

The power source 7 (see FIG. 1) applies a source voltage Vcc between a source terminal and a ground terminal of the driving circuit 5. Between a voltage terminal and the ground terminal, the switching elements Tr1 and Tr2 are connected in series via a connection point O2, and the switching elements Tr3 and Tr4 are connected in series via a connection point O1. One end of the resistor R1 is connected to the ground terminal. The switching element Tr7 is connected between the connection point O2 and the other end of the resistor R1. The switching element Tr8 is connected between the connection point O1 and the other end of the resistor R1. The coil L1 of the stepping motor 4 is connected between the connection points O2 and O1.

Operations in Embodiment 1

Figure 5A:
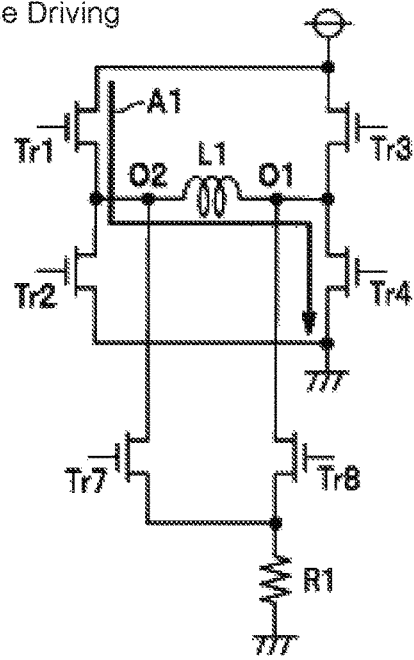
FIG. 5A is a diagram illustrating operations carried out during pulse driving of a driving circuit according to Embodiment 1.
Figure 5B:
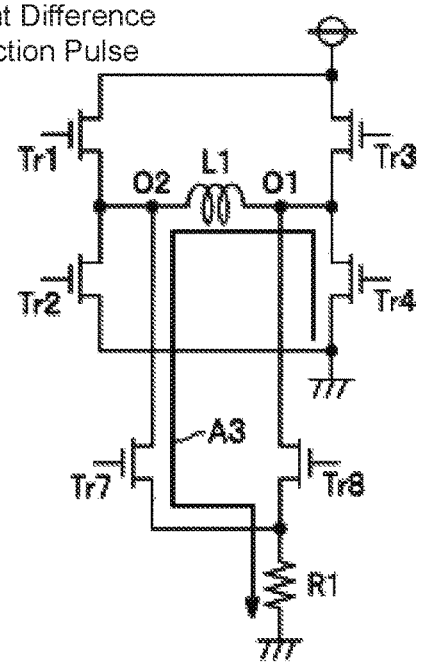
FIG. 5B is a diagram illustrating operations carried out during test pulse supply of a driving circuit according to Embodiment 1.
Figure 5C:
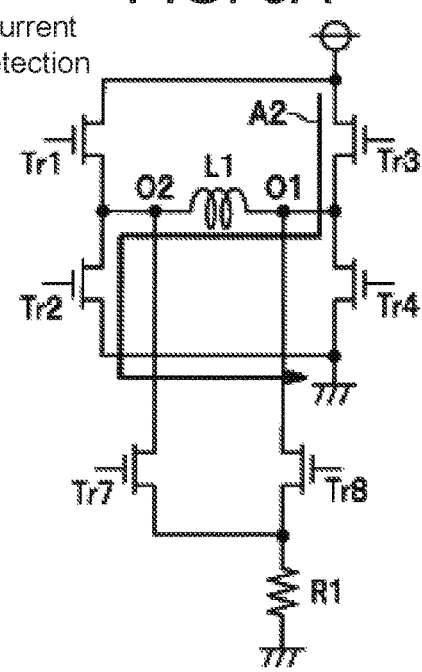
FIG. 5C is a diagram illustrating operations carried out during current detection of a driving circuit according to Embodiment 1.

Next, operations according to the present embodiment will be described with reference to FIGS. 5A to 5D. FIGS. 5A to 5D are diagrams illustrating operations carried out during pulse driving of the driving circuit 5, during the supply of the current difference detection pulse, during current detection, and during current detection (reverse direction), respectively. The stepping motor 4 is capable of rotating at a step angle of 180 degrees. FIGS. 5A to 5C indicate current flowing in the driving circuit 5 in a period in which the rotor 48 rotates 180 degrees from a given step angle to the next step angle.

FIG. 5A illustrates operations when a driving pulse for rotationally driving the rotor 48 is inputted. Here, the driving pulse generating circuit 692 (see FIG. 2) turns the switching elements Tr1 and Tr4 on and the other switching elements off. As a result, current flows to the coil L1 along a path A1 traversing the switching elements Tr1 and Tr4. In a normal state, the rotor 48 is rotationally driven approximately 180 degrees. This state is called "rotation success." However, in the case where the electronic timepiece 1 is subjected to vibrations or impacts when the driving pulse is inputted, there are situations where the rotor 48 does not rotate despite the driving pulse being inputted. This state is called "rotation failure."

Next, FIG. 5B illustrates operations carried out when the current difference detection pulse is inputted to detect the position of the rotor 48. Here, the current difference detection pulse generating circuit 693 (see FIG. 2) turns the switching elements Tr2 and Tr3 on and the other switching elements off. As a result, current flows to the coil L1 along a path A2 traversing the switching elements Tr2 and Tr3, which is the opposite direction from the path A1. The coil L1 stores magnetic energy due to the current flowing in the coil L1. However, a pulse width of the current difference detection pulse is shorter than that of the driving pulse, and thus the rotor 48 is not rotationally driven by the current difference detection pulse.

Next, FIG. 5C illustrates operations carried out during current detection, in which the magnetic energy stored in the coil L1 is released as current and the value of that current is detected. Here, the current difference detection pulse generating circuit 693 turns the switching elements Tr4 and Tr7 on and the other switching elements off. As a result, current flows along a path A3 traversing the switching element Tr4, the coil L1, the switching element Tr7, and the resistor R1, and a terminal voltage proportional to that current arises at the resistor R1. The terminal voltage at the resistor R1 is converted into a digital signal by the A/D converter 695 illustrated in FIG. 2. The detection/determination circuit 696 determines whether or not the rotor 48 has successfully rotated on the basis of the terminal voltage. Note that in the case where the rotation has failed, the rotor 48 is rotated by applying a correction pulse similar to the driving pulse.

Figure 5D:
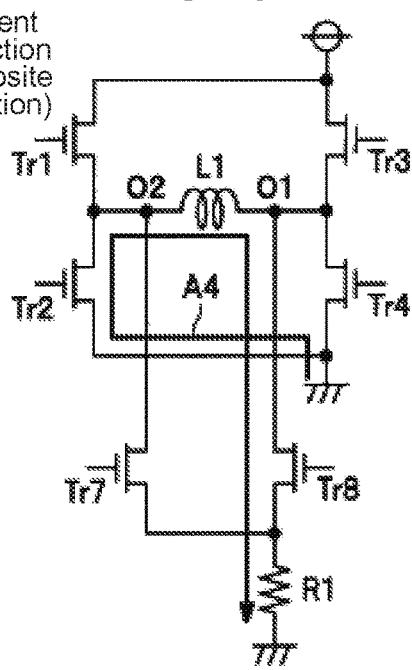
FIG. 5D is a diagram illustrating operations carried out during current detection (reverse direction) of a driving circuit according to Embodiment 1.

After the operations illustrated in FIGS. 5A to 5C are complete, in a period where the rotor 48 rotates the remaining 180 degrees, current in the direction opposite from that indicated in FIGS. 5A to 5C is supplied to the coil L1. In other words, during the driving pulse input, a driving pulse is supplied along the path A2 indicated in FIG. 5B under the control of the driving pulse generating circuit 692. Likewise, during the current difference detection pulse input, a current difference detection pulse is supplied along the path A1 indicated in FIG. 5A under the control of the current difference detection pulse generating circuit 693. Then, during current detection, the current difference detection pulse generating circuit 693 turns the switching elements Tr2 and Tr8 on and the other switching elements off. As a result, current flows along a path A4 traversing the switching element Tr2, the coil L1, the switching element Tr8, and the resistor R1, and a terminal voltage proportional to that current arises at the resistor R1, as illustrated in FIG. 5D.

Next, waveforms at various elements when rotation is successful will be described with reference to FIGS. 6A to 6C. FIG. 6A is a waveform diagram illustrating the coil current I1, FIG. 6B is a waveform diagram illustrating the coil voltage V1 applied to the coil L1 by the switching elements Tr1 to Tr4, and FIG. 6C is a diagram illustrating BH characteristics of the core 46. The horizontal axis in FIG. 6C represents a magnetic field H in the core 46 at the location of the coil L1, and the vertical axis represents a magnetic flux density B of the core 46 at the same location.

In FIG. 6B, the coil voltage V1 applied to the coil L1 in a period from times t1 to t2 and a period from times t3 to t4 corresponds to the driving pulse and the current difference detection pulse indicated in FIGS. 5A and 5B, respectively. Meanwhile, in FIG. 6A, the coil current I1 flowing in a period from times t4 to t5 corresponds to the current flowing to the resistor R1 through the path A3 indicated in FIG. 5C. Furthermore, the magnetic field H indicated by the broken line in FIG. 6C is a magnetic field produced by the magnet constituting the rotor 48, whereas the magnetic field H indicated by the dot-dash line indicates a result of adding the magnetic field produced by the magnet with a magnetic field produced by the current difference detection pulse.

In the case where the rotation of the rotor 48 is successful, the magnetic field produced by the current difference detection pulse acts in a direction that weakens the magnetic field produced by the magnet. As such, the magnetic field H obtained by adding the two together belongs to a region where the effect of magnetic saturation is comparatively low, and thus a slope dB/dH of a tangent of the BH characteristics is comparatively high. The slope dB/dH of the tangent indicates a differential permeability $\mu$, and because the inductance of the coil L1 is proportional to the differential permeability $\mu$, the inductance has a comparatively high value. Accordingly, as indicated in FIG. 6A, the coil current I1 has a comparatively low value during the supply of the current difference detection pulse (times t3 to t4) and during current detection (times t4 to t5). If a peak value of the coil current I1 is less than or equal to a threshold Ith, the detection/determination circuit 696 (see FIG. 2) determines that the rotation is successful.

Here, a width of the current difference detection pulse (time t3 to t4) is preferably in a range from greater than or equal to 0.01 milliseconds to less than or equal to 1 millisecond, and more preferably in a range from greater than or equal to 0.05 milliseconds to less than or equal to 0.1 milliseconds. In terms of a relative relationship with the width of the driving pulse (time t1 to t2), the width of the current difference detection pulse is preferably in a range of ⅓ to ⅟₃₀₀ the width of the driving pulse, and more preferably in a range from ⅟₃₀ to ⅟₆₀. The reasoning behind these numerical values is that the accuracy of the rotation detection will worsen if the current difference detection pulse is too short, whereas the rotor 48 will move if the current difference detection pulse is too long.

Next, waveforms at various elements when rotation fails will be described with reference to FIGS. 7A to 7C. FIGS. 7A to 7C are waveform diagrams and a characteristic diagram corresponding to FIGS. 6A to 6C, but for when rotation fails.

In FIG. 7B, the coil voltage V1 applied to the coil L1 in a period from times t11 to t12 and a period from times t13 to t14 corresponds to the driving pulse and the current difference detection pulse, respectively. Meanwhile, in FIG. 7A, the coil current I1 flowing in a period from times t14 to t15 corresponds to the current flowing to the resistor R1 through the path A3 indicated in FIG. 5C. Furthermore, the magnetic field H indicated by the broken line in FIG. 7C is a magnetic field produced by the magnet constituting the rotor 48, whereas the magnetic field H indicated by the dot-dash line indicates a result of adding the magnetic field produced by the magnet with a magnetic field produced by the current difference detection pulse.

In the case where the rotation of the rotor 48 has failed, the magnetic field produced by the current difference detection pulse acts in a direction that strengthens the magnetic field produced by the magnet. As such, the magnetic field H obtained by adding the two together belongs to a region where the effect of magnetic saturation is comparatively high, and thus the slope dB/dH of the tangent of the BH characteristics is comparatively low. The inductance of the coil L1 becomes a comparatively low value as a result, and thus as indicated in FIG. 7A, the coil current I1 has a comparatively high value during the supply of the current difference detection pulse (times t13 to t14) and during current detection (times t14 to t15).

As described above, the terminal voltage at the resistor R1, which is proportional to the coil current I1, is converted into a digital signal by the A/D converter 695 illustrated in FIG. 2, and the digital signal is then supplied to the detection/determination circuit 696. The detection/determination circuit 696 calculates the coil current I1 on the basis of the terminal voltage at the resistor R1, and compares the peak value of the coil current I1 with the threshold Ith. If the peak value of the coil current I1 is less than or equal to the threshold Ith, the rotation is determined to have succeeded, whereas if the peak value of the coil current I1 exceeds the threshold Ith, the rotation is determined to have failed.

Effects of Embodiment 1

As described thus far, a driving device (11) according to the present embodiment includes:

a processor (69) that determines whether or not a rotor has rotated on the basis of a difference in currents flowing in a coil.

The processor (69):

outputs a current difference detection pulse for using the difference in currents flowing in the coil to detect a difference between magnetic flux densities arising based on the stop angle of the magnet in the case where the rotor has rotated and in the case where the rotor has not rotated.

Here, the "difference in currents" is, for example, the difference between the peak value of the coil current I1 and the threshold Ith.

A driving device (11) according to another aspect of the present embodiment includes:

a current difference detection pulse generating circuit (693) that takes, as a subject coil, a single coil in which a first magnetic flux density from the magnet in the case where a rotor (48) is assumed to have rotated correctly is greater than or equal to a second magnetic flux density from the magnet in the case where the rotor (48) is assumed to not have rotated correctly, and supplies, to the subject coil, a current difference detection pulse for producing a magnetic flux in a direction that reduces the first magnetic flux density; and a detection/determination circuit (696) that determines whether or not the rotor (48) has rotated correctly on the basis of current flowing in the subject coil.

In other words, in FIG. 3, the current flowing in the coil (L1) is substantially the same regardless of which stopped position the rotor 48 is at. Thus, the first magnetic flux density is equal to the second magnetic flux density, meaning that the first magnetic flux density is greater than or equal to the second magnetic flux density.

The rotation is successful more frequently than the rotation fails, and the current difference detection pulse generating circuit (693) supplies the current difference detection pulse to the subject coil (L1) so as to produce a magnetic flux in the direction that lowers the first magnetic flux density in the case where the rotation is successful. Accordingly, the current flowing in the subject coil (L1) decreases (becomes as indicated at times t3 to t4 in FIG. 6A) more frequently than that current increases (becomes as indicated at times t13 to t14 in FIG. 7A).

Thus, according to the present embodiment, rotation of the rotor (48) can be detected accurately while suppressing power consumption.

Additionally, the current difference detection pulse generating circuit (693) supplies the current difference detection pulse to the subject coil during a prescribed supply period (times t3 to t4 and t13 to t14); and the detection/determination circuit (696) determines whether or not the rotor (48) has rotated correctly on the basis of current flowing in the subject coil after the supply period has ended.

Additionally, the rotor (48) has a plurality of stopped positions at which the rotor (48) magnetically stabilizes and stops within a single rotation range; and the detection/determination circuit (696) determines whether or not the rotor (48) is positioned in a stopped position for the case where the rotor (48) has rotated correctly.

Furthermore, the detection pulse has a waveform in which a high-level period is greater than or equal to 0.01 milliseconds and less than or equal to 1 millisecond.

Here, "high-level period" is, for example, a period in which a voltage whose absolute value exceeds zero is applied by the current difference detection pulse generating circuit (693) to the subject coil.

These features make it possible to greatly reduce the amount of power consumed as compared to known techniques that supply a high-frequency current to the coil (L1).

Embodiment 2

Configuration of Embodiment 2

Figure 8:
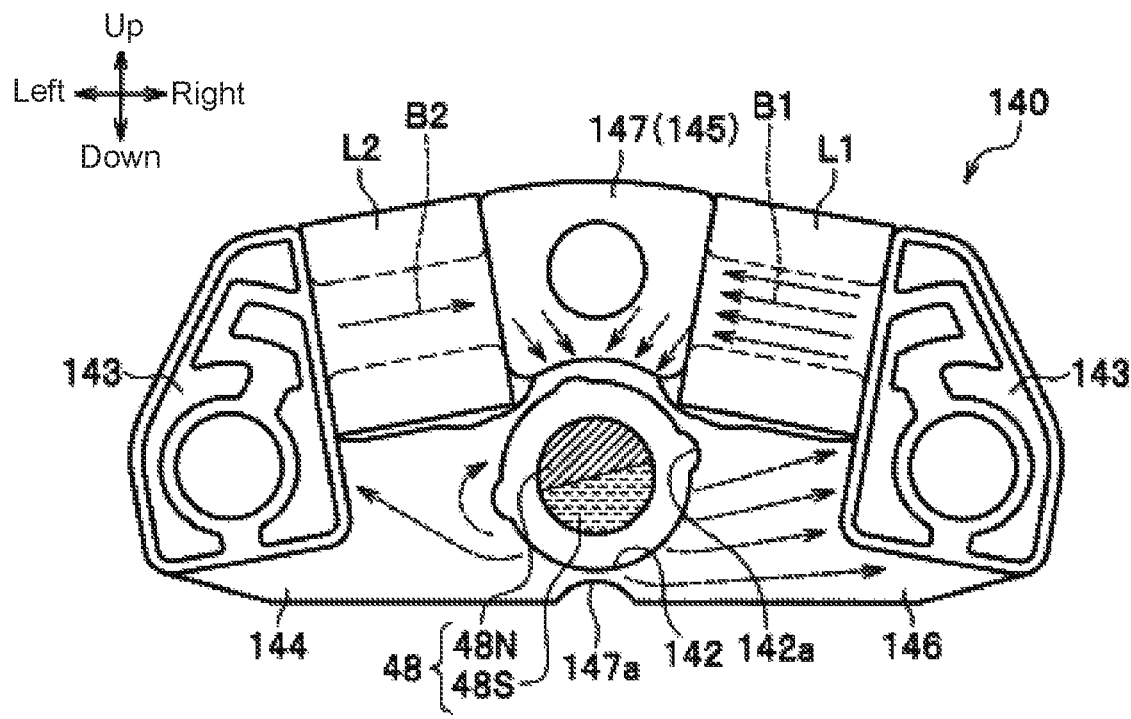
FIG. 8 is a plan view of a stepping motor according to Embodiment 2.
Figure 9:
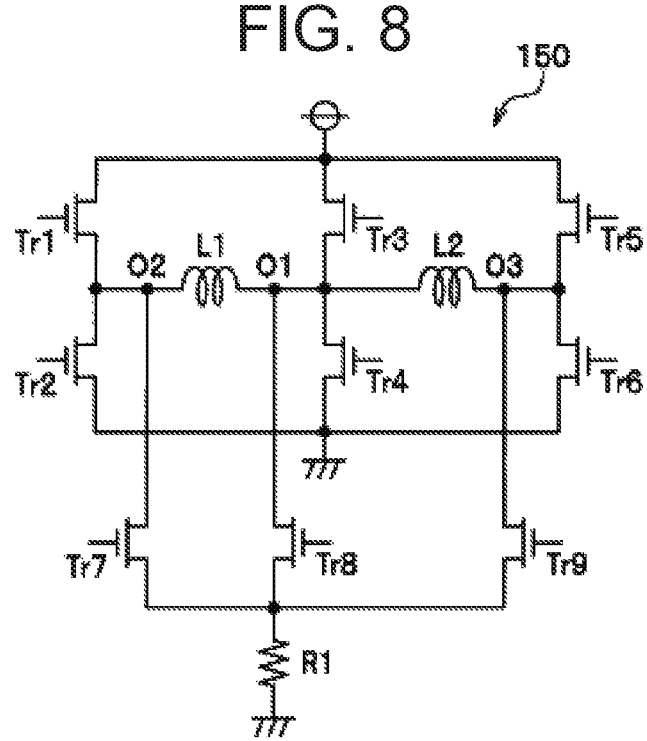
FIG. 9 is a circuit diagram illustrating a driving circuit according to Embodiment 2.

An electronic timepiece according to Embodiment 2 of the present invention will be described next. Although the overall configuration of the electronic timepiece according to the present embodiment is the same as that according to Embodiment 1 (see FIG. 1), the present embodiment differs in that stepping motors 140, one of which is illustrated in FIG. 8, and a driving circuit 150, illustrated in FIG. 9, are provided instead of the stepping motors 4 and the driving circuit 5 according to Embodiment 1. In FIGS. 8 and 9, elements corresponding to those illustrated in FIGS. 1 to 7C are given the same reference numerals, and descriptions thereof may be omitted.

FIG. 8 is a plan view of the stepping motor 140.

The stepping motor 140 includes a stator 147 and a rotor 48. The configuration of the rotor 48 is the same as that described in Embodiment 1 (see FIG. 3). In the present embodiment, the rotor 48 can rotate counter-clockwise or clockwise at a prescribed step angle in response to a driving pulse being applied to coils L1 and L2, which will be described later. The step angle is 180 degrees in the present embodiment.

The stator 147 includes a substantially quadrangular center yoke 145, a pair of side yokes 144 and 146 disposed below the center yoke 145, and the coils L1 and L2. The side yokes 144 and 146 are provided with substantially bilateral symmetry so as to surround the rotor 48. The coils L1 (a first coil) and L2 (a second coil) are inserted between an upper end portion of the center yoke 145 and the side yokes 144 and 146, respectively. The coils L1 and L2 are connected to the driving circuit 150, which will be described later, via a terminal block 143.

A substantially circular opening 142 is formed in the stator 147, at a point where a lower end of the center yoke 145 intersects with the pair of side yokes 144 and 146, and the rotor 48 is disposed in the opening 142. When magnetized, three magnetic poles are produced in the stator 147 along an outer circumference of the rotor 48, one near the center yoke 145, one near the side yoke 144, and one near the side yoke 146. When driving pulses are applied to the coils L1 and L2, the three magnetic poles of the stator 147 switch polarities. Meanwhile, a semicircular recess 147a is formed below the opening 142 at the location where the side yokes 144 and 146 connect.

One end of the coil L1 is magnetically linked to the center yoke 145, and another end of the coil L1 is magnetically linked to a free end of the side yoke 146. Likewise, one end of the coil L2 is magnetically linked to the center yoke 145, and another end of the coil L2 is magnetically linked to a free end of the side yoke 144.

In the present embodiment, the driving pulse generating circuit 692 (see FIG. 2) applies driving pulses to the coils L1 and L2. Magnetic fluxes arise in the coils L1 and L2 as a result, and the magnetic fluxes flow along the magnetic core of the coil L1 and the stator 147 magnetically linked thereto, switching the three magnetic poles as appropriate.

Three recesses 142a are formed in an inner circumferential surface of the opening 142. The three recesses 142a are formed in a direction tilted approximately 10 degrees counter-clockwise from the upward direction of the center yoke 145, and in two directions perpendicular to the stated tilted direction. The rotor 48 can be kept in a static state by the three recesses 142a. In the present embodiment, the stepping motor 140 has the highest index torque (holding torque) in a state where the polarization directions of the rotor 48 oppose directions tilted approximately 80 degrees and approximately 260 degrees clockwise relative to the direction of the center yoke 145. As such, in a de-energized state, that is, when no driving pulse is being applied, the rotor 48 magnetically stabilizes and stops at the stopped position illustrated in FIG. 8 or a stopped position rotated 180 degrees from that stopped position.

FIG. 9 is a circuit diagram illustrating the driving circuit 150.

The driving circuit 150 applies driving pulses to the two coils L1 and L2, and applies the current difference detection pulse to the coil L1. The driving circuit 150 includes an H-bridge circuit constituted of switching elements Tr1 to Tr6 that are MOSFETs. Meanwhile, switching elements Tr7 to Tr9 and a resistor R1 constitute a discharge circuit that discharges energy stored in the coils L1 and L2.

The power source 7 (see FIG. 1) applies a source voltage Vcc between a source terminal and a ground terminal of the driving circuit 150. Between a voltage terminal and the ground terminal, the switching elements Tr1 and Tr2 are connected in series via a connection point O2, the switching elements Tr3 and Tr4 are connected in series via a connection point O1, and the switching elements Tr5 and Tr6 are connected in series via a connection point O3. One end of the resistor R1 is connected to the ground terminal. The switching element Tr7 is connected between the connection point O2 and the other end of the resistor R1. The switching element Tr8 is connected between the connection point O1 and the other end of the resistor R1. The switching element Tr9 is connected between the connection point O3 and the other end of the resistor R1. Furthermore, the coil L1 of the stepping motor 140 is connected between the connection points O2 and O1, and the coil L2 is connected between the connection points O3 and O1.

Operations in Embodiment 2

In Embodiment 2, the driving pulse generating circuit 692 (see FIG. 2) turns the switching elements Tr1 to Tr6 illustrated in FIG. 9 on and off so as to supply driving pulses to the coils L1 and L2 (see FIGS. 6B and 7B) and rotationally drive the rotor 48. As described above, the rotor 48 magnetically stabilizes and stops at the stopped position illustrated in FIG. 8 or a stopped position rotated 180 degrees from that stopped position. At this time, when the coils L1 and L2 are in the de-energized state, magnetic flux densities B1 and B2 arising in the cores of the coils L1 and L2 are as indicated by the broken line arrows in FIG. 8.

In the present embodiment, the position of the recesses 142a are tilted counter-clockwise by approximately 10 degrees from the up, down, left, and right directions, and thus the magnetic flux density B1 is greater than B2. At the stopped position rotated 180 degrees from the stopped position illustrated in FIG. 8, the orientation of the magnetic flux is inverted; however, the magnetic flux density B1 is nevertheless greater than B2. This means that at the stopped position, the influence of magnetic saturation is greater in the coil L1 than in the coil L2.

Accordingly, in the present embodiment, the current difference detection pulse generating circuit 693 supplies the current difference detection pulse (see FIGS. 6B and 7B) to the coil L1 but does not supply the current difference detection pulse to the coil L2. On the basis of the current difference detection pulse, the waveform of the coil current I1 flowing in the coil L1 is the same as that illustrated in FIG. 6A when rotation is successful and as that illustrated in FIG. 7B when rotation fails. Thus, in the same manner as in Embodiment 1, if the peak value of the coil current is less than or equal to the threshold Ith, the detection/determination circuit 696 determines that the rotation has succeeded, whereas if the peak value of the coil current exceeds the threshold Ith, the detection/determination circuit 696 determines that the rotation has failed.

COMPARISON EXAMPLE

To clarify the effects of the present embodiment, the configuration of a stepping motor 160 according to a comparison example of the present embodiment will be described next with reference to FIG. 10.

Figure 10:
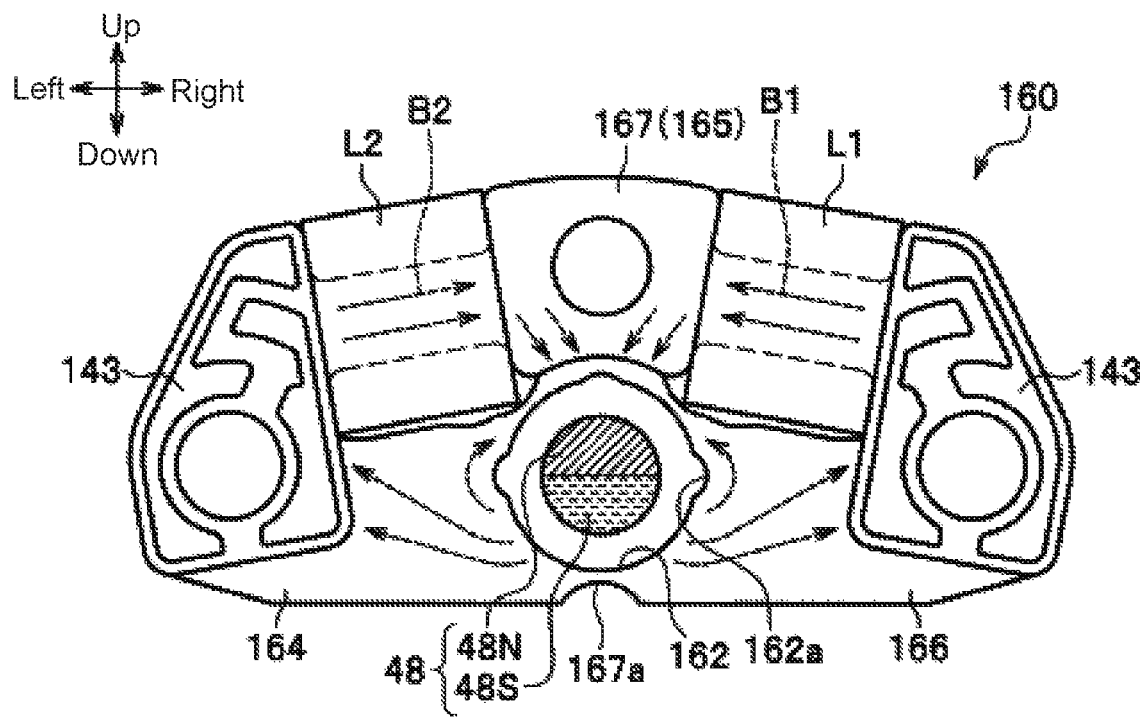
FIG. 10 is a plan view of a stepping motor according to a comparison example.

FIG. 10 is a plan view of the stepping motor 160. The stepping motor 160 includes a stator 167 and a rotor 48. The stator 167 includes a substantially quadrangular center yoke 165, a pair of side yokes 164 and 166 disposed below the center yoke 145, and the coils L1 and L2. The side yokes 164 and 166 are provided with substantially bilateral symmetry so as to surround the rotor 48. The center yoke 165 and the side yokes 164 and 166 have substantially the same shapes as the center yoke 145 and the side yokes 144 and 146 of Embodiment 2 illustrated in FIG. 8. The shape of a recess 167a formed below the rotor 48 is also the same as the shape of the recess 147a according to Embodiment 2.

However, a substantially circular opening 162 formed at a point where the center yoke 165 intersects with the side yokes 164 and 166 has recesses 162a formed at different positions as compared to the opening 142 according to Embodiment 2. In other words, the recesses 162a are formed above and to the left and right of the rotor 48 in the opening 162 according to the present comparison example. The stator 167 according to the present comparison example is formed with substantially bilateral symmetry, and thus a magnetic flux outputted from the rotor 48 returns to the rotor 48 after being substantially bisected by the side yokes 164 and 166. Accordingly, when the coils L1 and L2 are in the de-energized state, the magnetic flux densities B1 and B2 arising in the cores of the coils L1 and L2 are substantially equal, as indicated by the broken line arrows in FIG. 10.

When the magnetic flux densities B1 and B2 are substantially equal in this manner, both are less susceptible to the effects of magnetic saturation. This causes the current flowing in the coils L1 and L2 due to the current difference detection pulses to have less of a difference between when the rotation is successful and when the rotation fails, which is problematic in that is becomes difficult to detect the rotation of the rotor 48.

Effects of Embodiment 2

According to an electronic timepiece of the present embodiment as described above, a motor (4) includes a first coil (L1) and a second coil (L2) as a plurality of coils; and a magnetic flux density (B1) in the case where current flows in the first coil (L1) is greater than a magnetic flux density (B2) in the case where current flows in the second coil (L2), at any of a plurality of stopped positions, and the first coil (L1) is selected as the subject coil at all of the plurality of stopped positions.

As described above, in the comparison example (see FIG. 10), in which the magnetic flux densities B1 and B2 are substantially equal, there is a problem in that it is difficult to detect the rotation of the rotor 48. However, according to Embodiment 2 (see FIG. 8), the stator 147 is configured such that the magnetic flux density B1 of the coil L1 is greater than the magnetic flux density B2 of the coil L2 at the stopped position. Thus the rotation of the rotor 48 can be detected with a high level of accuracy while suppressing power consumption, even when using the dual core-type stepping motors 140.

Embodiment 3

Figure 11:
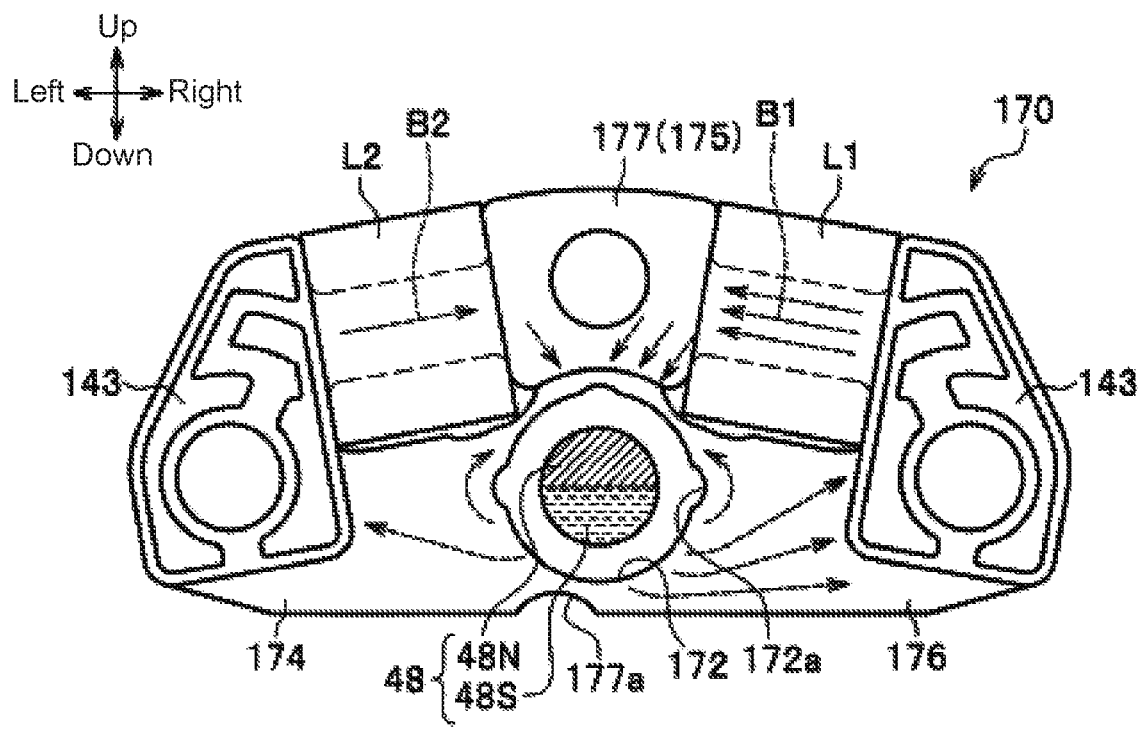
FIG. 11 is a plan view of a stepping motor according to Embodiment 3.

An electronic timepiece according to Embodiment 3 of the present invention will be described next. Although the overall configuration of the electronic timepiece according to the present embodiment is the same as that according to Embodiment 1 (see FIG. 1), the present embodiment differs in that stepping motors 170, one of which is illustrated in FIG. 11, and the same driving circuit 150 as that used in Embodiment 2 (see FIG. 9), are provided instead of the stepping motors 4 and the driving circuit 5 according to Embodiment 1. In FIG. 11, elements corresponding to those illustrated in FIGS. 1 to 10 are given the same reference numerals, and descriptions thereof may be omitted.

FIG. 11 is a plan view of the stepping motor 170.

The stepping motor 170 includes a stator 177 and a rotor 48. The configuration of the rotor 48 is the same as that described in Embodiment 1 (see FIG. 3). The stator 177 includes a substantially quadrangular center yoke 175, a pair of side yokes 174 and 176 disposed below the center yoke 145, and the coils L1 and L2. The side yokes 174 and 176 are provided with substantially bilateral symmetry so as to surround the rotor 48. The center yoke 175 and the side yokes 174 and 176 have substantially the same shapes as the center yoke 165 and the side yokes 164 and 166 according to the comparison example of Embodiment 2 (see FIG. 10). The shape of an opening 172 formed at a point of intersection thereof, too, is the same as the shape of the opening 162 according to the comparison example illustrated in FIG. 10.

However, in FIG. 11, a semicircular recess 177*a* formed below the rotor 48 is shifted to the left as compared to the recess 167*a* illustrated in FIG. 10. In the present embodiment, a magnetic flux oriented downward from the rotor 48 branches to the side yokes 174 and 176. However, the cross-sectional area of the side yoke 174 is smaller near the recess 177*a*, and thus a greater magnetic flux flows in the side yoke 176 than in the side yoke 174. Aside from this, the configuration is the same as in Embodiment 2.

Thus according to the present embodiment, the rotation of the rotor 48 can be detected with a high level of accuracy while suppressing power consumption in the same manner as in Embodiment 2, even when using dual core-type stepping motors 170.

Embodiment 4

Configuration of Embodiment 4

Figure 12:
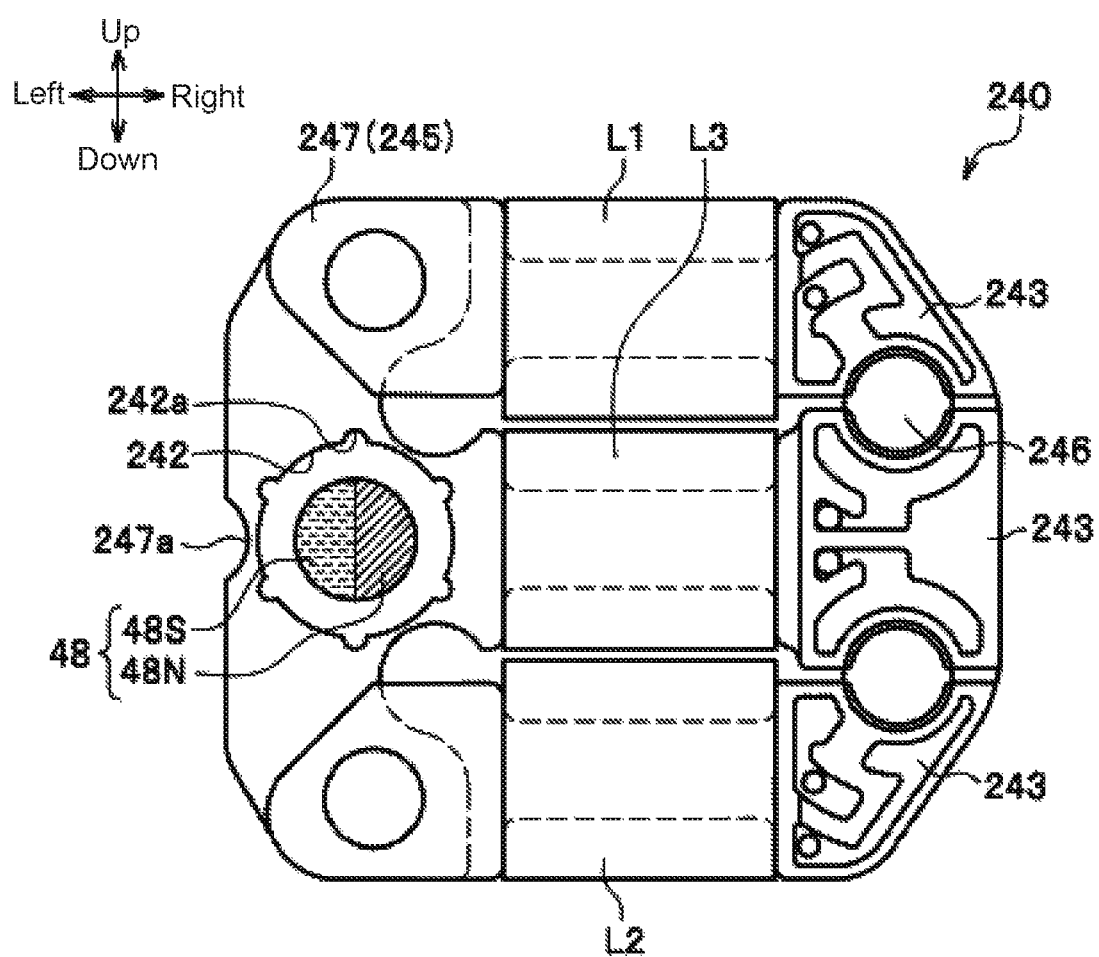
FIG. 12 is a plan view of a stepping motor according to Embodiment 4.
Figure 13:
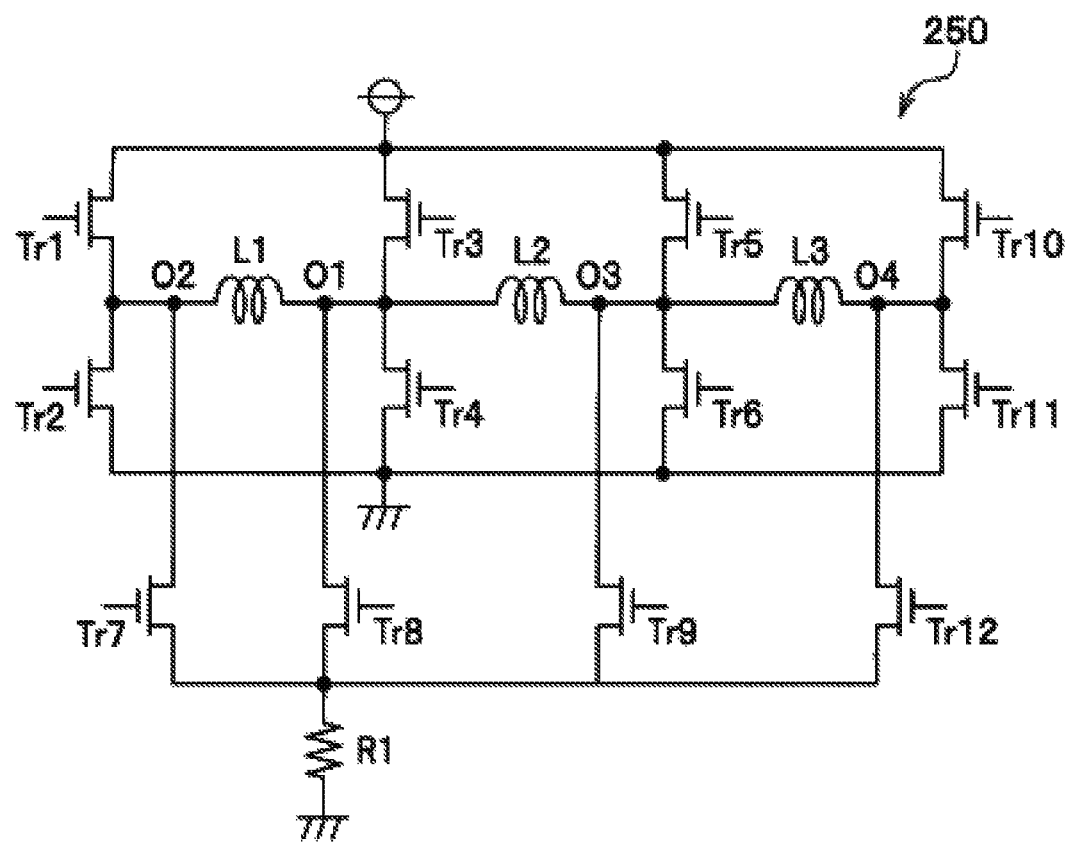
FIG. 13 is a circuit diagram illustrating a driving circuit according to Embodiment 4.

An electronic timepiece according to Embodiment 4 of the present invention will be described next. Although the overall configuration of the electronic timepiece according to the present embodiment is the same as that according to Embodiment 1 (see FIG. 1), the present embodiment differs in that stepping motors 240, one of which is illustrated in FIG. 12, and a driving circuit 250, illustrated in FIG. 13, are provided instead of the stepping motors 4 and the driving circuit 5 according to Embodiment 1. In FIGS. 12 and 13, elements corresponding to those illustrated in FIGS. 1 to 11 are given the same reference numerals, and descriptions thereof may be omitted.

FIG. 12 is a plan view of the stepping motor 240.

The stepping motor 240 includes a stator 247 and a rotor 48. The configuration of the rotor 48 is the same as that described in Embodiment 1 (see FIG. 3). In the present embodiment, the rotor 48 can rotate counter-clockwise or clockwise at a prescribed step angle in response to a driving pulse being applied to a coil L1 (a first coil), a coil L2 (a second coil), and a coil L3 (a third coil), which will be described later. The step angle is 60 degrees in the present embodiment.

The stator 247 includes a substantially E-shaped first yoke 245 and a substantially I-shaped second yoke 246. A plurality of terminal blocks 243 are mounted to a front surface of the second yoke 246. The coils L1, L2, and L3 are inserted between the first and second yokes 245 and 246. The coils L1, L2, and L3 are magnetically linked to the first and second yokes 245 and 246, and are connected to the driving circuit 250, which will be described later, via the terminal blocks 243.

A substantially circular opening 242 is formed in a central area of the first yoke 245, and the rotor 48 is disposed in the opening 242. When magnetized, three magnetic poles are produced in the stator 147 around the opening 242. When driving pulses are applied to the coils L1, L2, and L3, the three magnetic poles of the stator 247 switch polarities. Additionally, a semicircular recess 247*a* is formed in the center of a left side surface of the first yoke 245.

Recesses 242*a* are formed in an inner circumferential surface of the opening 242 at six equal intervals in the rotation direction. The rotor 48 can be kept in a static state by these recesses 242*a*. In the present embodiment, the stepping motor 240 has the highest index torque (holding torque) in a state where the polarization direction of the rotor 48 opposes the recesses 242a. As such, in a de-energized state, that is, when no driving pulse is being applied, the rotor 48 magnetically stabilizes and stops at the stopped position illustrated in FIG. 12 or a stopped position rotated 60 degrees, 120 degrees, 180 degrees, 240 degrees, or 300 degrees from that stopped position.

FIG. 13 is a circuit diagram illustrating the driving circuit 250.

The driving circuit 250 applies driving pulses and current difference detection pulses to the three coils L1, L2, and L3, and includes an H-bridge circuit constituted of switching elements Tr1 to Tr6, Tr10, and Tr11, which are MOSFETs. Meanwhile, switching elements Tr7 to Tr9 and Tr12 and a resistor R1 constitute a discharge circuit that discharges energy stored in the coils L1 and L2.

The power source 7 (see FIG. 1) applies a source voltage Vcc between a source terminal and a ground terminal of the driving circuit 250. Between a voltage terminal and the ground terminal, the switching elements Tr1 and Tr2 are connected in series via a connection point O2, and the switching elements Tr3 and Tr4 are connected in series via a connection point O1. Likewise, the switching elements Tr5 and Tr6 are connected in series via a connection point O3, and the switching elements Tr10 and Tr11 are connected in series via a connection point O4.

Additionally, one end of the resistor R1 is connected to the ground terminal. The switching element Tr7 is connected between the connection point O2 and the other end of the resistor R1. The switching element Tr8 is connected between the connection point O1 and the other end of the resistor R1. Likewise, the switching element Tr9 is connected between the connection point O3 and the other end of the resistor R1. The switching element Tr12 is connected between the connection point O4 and the other end of the resistor R1. Furthermore, the coil L1 of the stepping motor 240 is connected between the connection points O2 and O1, the coil L2 is connected between the connection points O3 and O1, and the coil L3 is connected between the connection points O3 and O4.

Operations in Embodiment 4

In Embodiment 4, the driving pulse generating circuit 692 (see FIG. 2) turns the switching elements Tr1 to Tr6, Tr10, and Tr11 illustrated in FIG. 13 on and off. As a result, driving pulses (see FIGS. 6B and 7B) are supplied to the coils L1, L2, and L3 to rotationally drive the rotor 48. As described above, the rotor 48 magnetically stabilizes and stops at the stopped position illustrated in FIG. 12 or a stopped position rotated 60 degrees, 120 degrees, 180 degrees, 240 degrees, or 300 degrees from that stopped position.

Figure 14:
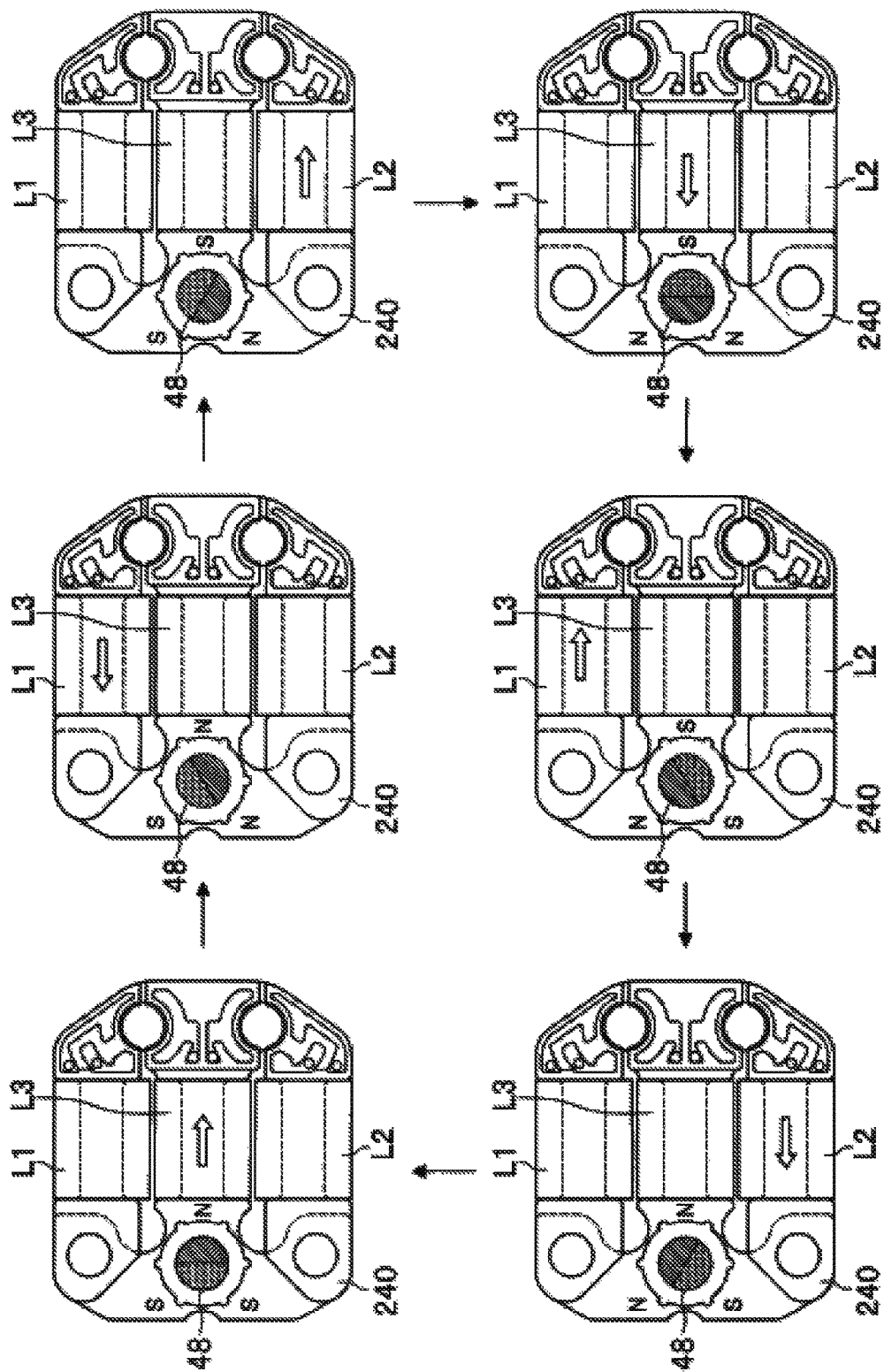
FIG. 14 is a diagram illustrating operations according to Embodiment 4.

FIG. 14 is a diagram illustrating operations according to the present embodiment. At each stopped position illustrated in FIG. 14, the letters "N" and "S" around the rotor 48 indicate magnetic poles induced in the first yoke 245 by the rotor 48, or in other words, magnetic poles induced when the coils L1, L2, and L3 are in a de-energized state. In each state illustrated, when an N pole or an S pole arises in two locations, an evenly-divided magnetic flux flows in the coils corresponding to those locations, which reduces the magnetic flux density. On the other hand, when an N pole or an S pole arises in only one location, substantially the entire magnetic flux flows in the corresponding coil, which increases the magnetic flux density. In other words, the magnetic flux density in that coil is highest among the coils L1, L2, and L3.

Accordingly, in the present embodiment, the current difference detection pulse generating circuit 693 (see FIG. 2) supplies the current difference detection pulse to the coil that will have the highest magnetic flux density in the case where the rotor 48 rotates correctly. In other words, the switching elements Tr2, Tr4, Tr6, Tr7 to Tr9, Tr11, and Tr12 are switched on and off such that the current difference detection pulse is supplied in a direction that reduces the magnetic flux density of that coil. In each stepping motor 240 illustrated in FIG. 14, the rotor 48 is illustrated as being in a state in which it is assumed the rotor 48 has rotated correctly. In FIG. 14, white arrows indicate the coils to which the current difference detection pulses are supplied and the directions of the magnetic fluxes arising due to the current difference detection pulses. As illustrated in FIG. 14, the current difference detection pulses are supplied to the coils L1, L2, and L3 cyclically, in a prescribed order, as long as the rotor 48 rotates correctly. The rotation detection carried out after the supply of the current difference detection pulses is the same as that described in Embodiments 1 to 3.

As described above, according to the present embodiment:

a motor (4) includes a first coil (L1), a second coil (L2), and a third coil (L3) as a plurality of coils; and a detection/determination circuit (696) supplies current difference detection pulses to the first coil (L1), the second coil (L2), and the third coil (L3) in a prescribed order as long as a rotor (48) rotates correctly.

Meanwhile, the subject coil that is supplied with the current difference detection pulse is a coil in which a first magnetic flux density from the magnet in the case where the rotor (48) is assumed to have rotated correctly is greater than or equal to a second magnetic flux density from the magnet in the case where the rotor (48) is assumed to not have rotated correctly.

Thus the rotation of the rotor 48 can be detected with a high level of accuracy while suppressing power consumption, even when using the triple core-type stepping motors 240.

<Variations>

The present invention is not intended to be limited to the embodiments described above, and many other variations can be made thereon. The embodiments described above are merely examples given to facilitate understanding of the present invention, and the present invention is not limited to a configuration including all of the elements described above. Additionally, configurations in one embodiment can be partially replaced with configurations from another embodiment, and likewise configurations from one embodiment can be added to the configurations of another embodiment. Furthermore, some configurations in a given embodiment can be omitted, or other configurations can be added and replace those configurations. The following are some possible variations that can be made on the embodiments described above.

(1) Although the foregoing embodiments describe examples in which single-core, dual-core, or triple-core stepping motors 4, 140, 170, or 240 are applied as specific examples of a "motor", a stepping motor having a greater number of coils may be applied instead. The present invention may also be applied in a motor aside from a stepping motor.

(2) Although the foregoing embodiments described the microcomputer 6 as being installed in the electronic timepiece 1, the microcomputer 6 may be applied in motor control for a variety of devices aside from the electronic timepiece 1.

(3) Although the foregoing embodiments describe an example in which the polarity of the driving pulse is opposite from the polarity of the current difference detection pulse, the configuration is not limited thereto. For example, the driving pulse and the current difference detection pulse may have the same polarity. In this case, in the case where the rotation of the rotor 48 is successful, the magnetic field produced by the current difference detection pulse acts in a direction that strengthens the magnetic field produced by the magnet. As such, the magnetic field H obtained by adding the two together belongs to a region where the effect of magnetic saturation is comparatively high, and thus the slope dB/dH of the tangent of the BH characteristics is comparatively low. The inductance of the coil L1 has a comparatively low value as a result. Accordingly, the coil current I1 has a comparatively high value during the supply of the current difference detection pulse (times t3 to t4) and during current detection (times t4 to t5). In the case where the rotation of the rotor 48 has failed, the magnetic field produced by the current difference detection pulse acts in a direction that weakens the magnetic field produced by the magnet. As such, the magnetic field H obtained by adding the two together belongs to a region where the effect of magnetic saturation is comparatively low, and thus a slope dB/dH of a tangent of the BH characteristics is comparatively high. The inductance of the coil L1 becomes a comparatively high value as a result, and thus the coil current I1 has a comparatively low value during the supply of the current difference detection pulse (times t13 to t14) and during current detection (times t14 to t15). If the peak value of the coil current I1 exceeds the threshold Ith, the rotation is determined to have succeeded, whereas if the peak value of the coil current I1 is less than or equal to the threshold Ith, the rotation is determined to have failed.

(4) The foregoing embodiments may be applied in the detection of skew in a hand caused by drop impacts, static electricity, or the like.

In other words, after an instance of rotation detection, carrying out the same rotation detection multiple times before the next driving pulse is supplied makes it possible to determine whether or not the hand has become skewed. Thus in the case where skew in the hand has been detected, that skew can be corrected by detecting the position of the hand and returning the hand to its normal position. This makes it possible to install second, minute, and hour hands having high weights and unbalanced moments, which could not be installed conventionally.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic timepiece, comprising:
   a motor having a rotor and at least two coils, the rotor being configured to rotate to a plurality of prescribed positions; and
   a driving processor for driving the motor, the driving processor being configured to:
   generate a detection pulse for detecting whether or not the rotor has rotated;
   cause the generated detection pulse to be applied to at least one of said at least two coils;
   receive a signal indicating a detected value of current flowing in the at least one of said at least two coils after the detection pulse has been outputted to the at least one of said at least two coils; and
   determine whether or not the rotor has rotated to one of the plurality of prescribed positions on the basis of the detected value of current; and
   a display unit including a hand driven by the rotor,
   wherein, for each of the plurality of prescribed positions, the driving processor causes the detection pulse to be applied to one of the at least two coils that generates the greatest magnetic flux density, among the at least two coils, when the rotor has properly rotated to the prescribed position such that the detection pulse is applied to the at least two coils sequentially while the rotor is rotating normally, and
   wherein the driving processor or another processor calculates a time and causes the hand to be driven to a position corresponding to the calculated time so as to display the time in the display unit.

2. The electronic timepiece according to claim 1, wherein the processor:
   causes the detection pulse to be applied to the at least one of said at least two coils for a prescribed period; and
   receives the signal that indicates the detected value of current flowing in the at least one of said at least two coils after the prescribed period has ended.

3. The electronic timepiece according to claim 1, wherein the detection pulse has a waveform in which a high-level period is 0.01 milliseconds to 1 millisecond.

4. The electronic timepiece according to claim 2, wherein the detection pulse has a waveform in which a high-level period is 0.01 milliseconds to 1 millisecond.

* * * * *